F. MERGNER.
ADJUSTABLE SUPPORT.
APPLICATION FILED FEB. 23, 1911.
1,024,804.
Patented Apr. 30, 1912.
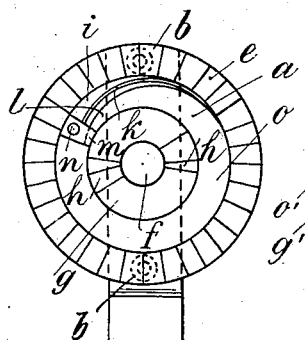
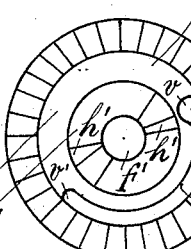
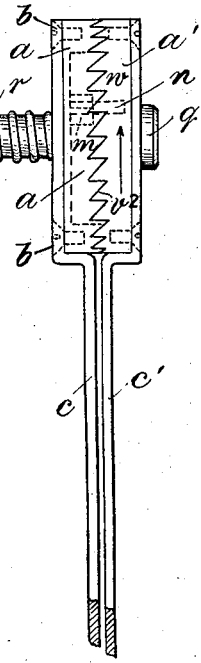
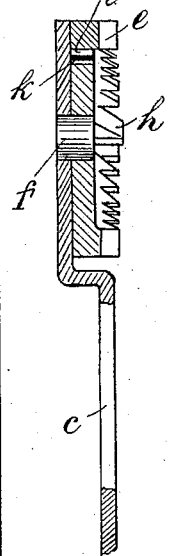
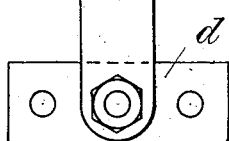
Witnesses:
Inventor:

UNITED STATES PATENT OFFICE.

FRIEDRICH MERGNER, OF NEUMARKT, OBERPFALZ, GERMANY.

ADJUSTABLE SUPPORT.

1,024,804.   Specification of Letters Patent.   Patented Apr. 30, 1912.

Application filed February 23, 1911. Serial No. 610,304.

*To all whom it may concern:*

Be it known that I, FRIEDRICH MERGNER, a subject of the King of Bavaria, German Empire, and a resident of Neumarkt, Oberpfalz, Bavaria, Germany, have invented certain new and useful Improvements in Adjustable Supports, of which the following is a specification.

This invention has for its object to provide an improved support comprising two supporting arms connected together by a joint composed of two toothed rings under spring action, which can be locked together in any position of vertical adjustment, for use with seats, chairs, stools, desk tops, table tops, and the like.

In the improved support the toothed rings are adapted to be disengaged from each other automatically by means of wedge-shaped projections according to the position of the arms. The toothed rings are automatically locked in their disengaged positions by means of a locking pin which is arranged to slide against the action of a spring in one toothed ring, in such a manner that when the said locking pin enters an enlargement of its guide groove in the other toothed ring, the two toothed rings are automatically caused or allowed to engage again with each other.

This invention is capable of various applications, and is particularly adapted for use with chairs or seats for the purpose of enabling the seat to be adjusted to any desired height from the floor or ground.

One form of this invention is illustrated by way of example in the accompanying drawings in which:

Figure 1 is an inside view of one supporting arm, and Fig. 2 is an inside view of the other supporting arm. Fig. 3 is an edge view of the two arms engaged together. Fig. 4 is a side elevation on a smaller scale of the support in use with the arms at an angle to each other. Fig. 5 is a central cross section of the ring of teeth and part of one arm.

As shown, $a$ (Fig. 1) is a toothed ring fixed by screws $b$ to one arm $c$ of the support. The other end of the arm $c$ is jointed by means of a pivoted plate $d$ to a suitable base plate (Fig. 4). The toothed ring $a$ has radially extending teeth $e$. A sleeve $g$ formed with a hole $f$, is arranged inside the toothed ring $a$ and has diametrically and oppposite shoulders $h$. A spring $k$ is arranged in a recess $i$ in the toothed ring $a$ and terminates in a bridge piece $m$ which bridges and overlaps both sides of the wall $l$. A pin $n$ is inserted in the bridge piece $m$. The toothed ring $a'$ of the other supporting arm $c'$ (Fig. 2) has likewise radially extending teeth $e'$ which are however directed oppositely to the teeth $e$ of the ring $a$. It has also a sleeve $g'$ with a hole $f'$. A semi-circular groove $o$ inside the teeth $e'$ is formed at one end with a circular enlargement $p$. The two supporting arms are connected together by a bolt $q$ and are held together by a spring $r$ encircling the same. The spring $r$ is prevented by a washer $t$ and a pin $u$ from slipping off the bolt $q$. The free end of the supporting arm $c'$ is jointed by means of a plate $d'$ to the seat, desk top or table top 1 (Fig. 4). When the seat or table is in use, the teeth $e$, $e'$ of the rings $a$, $a'$ are in engagement with one another, and the pin $n$ of the bridge piece $m$ of the ring $a$ is engaged in the groove $o$ in the ring $a'$. As many intermediate positions can be obtained between the limits $v$ and $v'$ as there are teeth $e'$ between the said limits.

When the movable supporting arms are swung upward, that is to say, when the seat or table top is being raised, the inclined faces $v^2$ of the teeth $e$, $e'$, slip over one another and cause the two rings $a$, $a'$ to move apart in the axial direction, in opposition to the force of the spring $r$. When the ring $a'$ has been turned through a distance equal to the pitch of the teeth, the engagement of the teeth $e$, $e'$ is restored by the action of the spring $r$. When the supporting arms $c'$ are swung up past their extended position, the shoulders $h$ $h'$ meet and owing to their oppositely arranged wedge-faces, cause the teeth $e$, $e'$ to move out of engagement again. At the same time the locking pin $n$ moves out of the groove $o$ and is pushed inward by the spring $k$ out of the range of the latter so that on the supporting arms being swung farther around or downward as indicated by either of the arrows 2 and 3 in Fig. 4, the locking pin $n$ will bear on the surface $o'$ of the ring $a$ and thus keep the teeth $e$, $e'$ out of engagement until the movable arm $c'$ comes into line with the fixed arm $c$. Then the pin $n$ enters the enlarged end $p$ of the groove $o$ and thus allows the teeth $e$, $e'$ of the rings $a$, $a'$ to engage one another.

Having thus described my invention, I claim and desire to secure by Letters Patent:

1. In an adjustable supporting mechanism, the combination with coacting locking elements connected to a base and to a part to be supported, means normally maintaining said locking elements in locked relation against return movement when one element is moved in one direction within a predetermined field of adjustment with respect to the companion member, and automatic means, actionable upon movement of the part to be supported beyond said predetermined field of movement, for throwing and retaining said elements out of locked relation permitting return movement of the article supported.

2. An adjustable support comprising, a disk member having radial ratchet teeth formed on the face thereof and diametrically disposed shoulders, a second disk member having ratchet teeth adapted to engage the said teeth of said first mentioned disk to hold the latter against movement in one direction, and diametrically disposed shoulders adapted to engage the said shoulders of said first mentioned disk member to throw the said teeth out of engagement upon movement through an arc of predetermined length, means normally holding said disk members with the said teeth in engagement with each other, and means operative upon engagement of the said diametrically disposed shoulders to hold said disk members out of engagement until they are returned to the starting point of the said arc of adjustment, the said disk members being adapted for connection to the base and structure supported, combined substantially as described.

3. An adjustable support comprising, a disk member having radial ratchet teeth formed on the face thereof, and a concentrically disposed groove, a pin carried by said disk member and movable in the said groove, means normally forcing said pin toward the center of said disk, a second disk member, pivoted to said first mentioned disk member provided with ratchet teeth, adapted to engage the said teeth of said first mentioned disk member to hold said disk members against movement therebetween in one direction, and having a concentrically described guide slot of predetermined length adapted to receive said pin and allow engaging movement between the said disk members through an angle of magnitude dependent upon the length of the said slot, means normally holding said disk members with said teeth in engagement, and means, operative upon movement between the said disk members through said angle of predetermined magnitude, to disengage the said teeth of said disk members and said pin from the said slot to permit return thereof to the starting point of the said slot, combined substantially as described.

In testimony whereof I affix my signature in presence of two witnesses.

FRIEDRICH MERGNER.

Witnesses:
MAX SCHNEIDER,
PAUL ZACHHOFER.

---

Copies of this patent may be obtained for five cents each, by addressing the "Commissioner of Patents, Washington, D. C."